Dec. 2, 1958 C. E. KIRCHER, JR., ET AL 2,862,622
FILTERS
Filed Aug. 10, 1955 4 Sheets-Sheet 3
FIG_9_
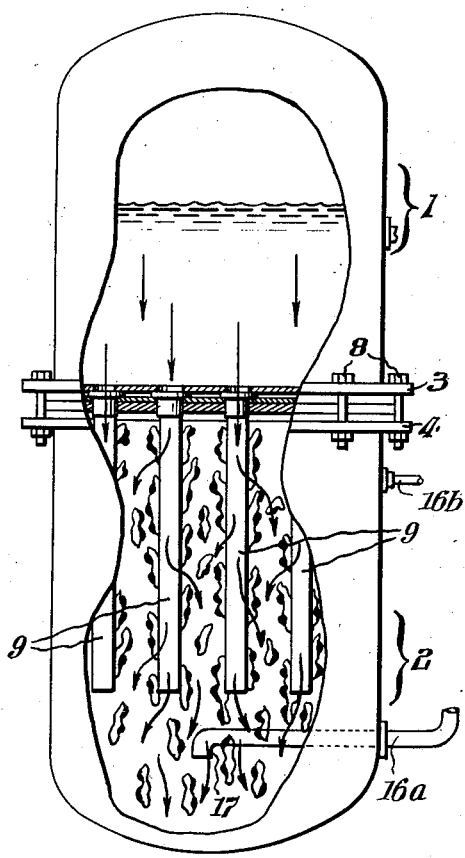
FIG_10_
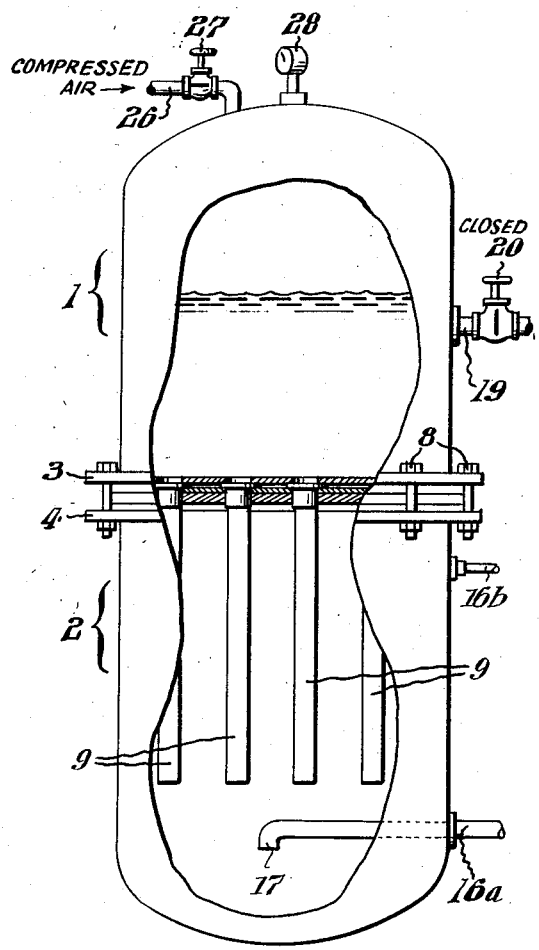
INVENTORS.
Charles E. Kircher Jr &
Robert J. Jones,
BY Paul & Paul
ATTORNEYS.

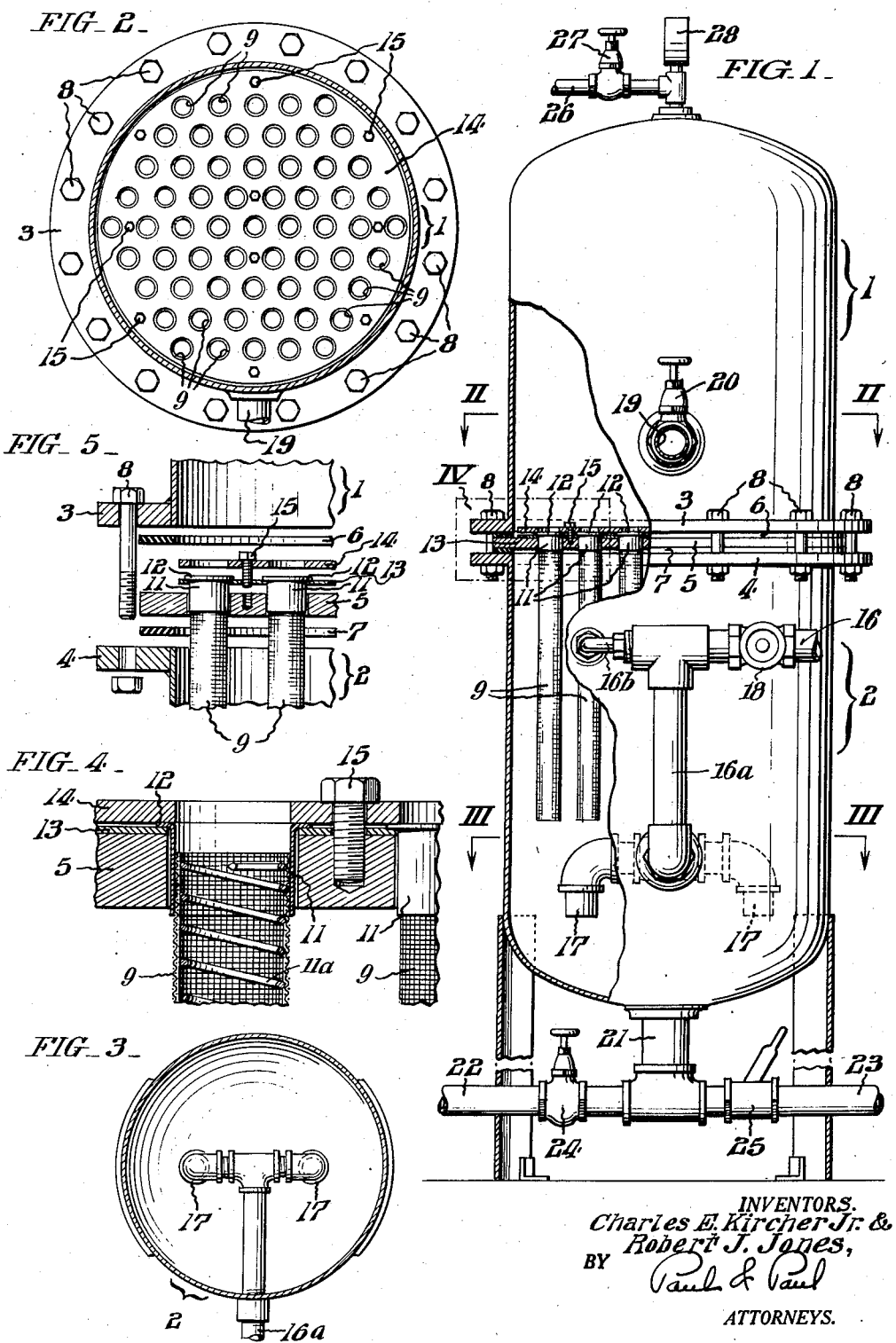

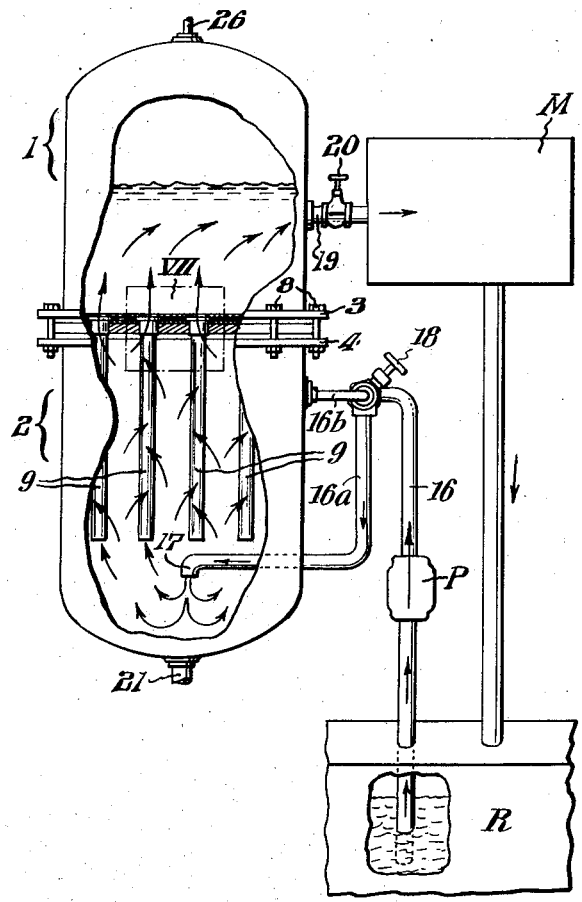
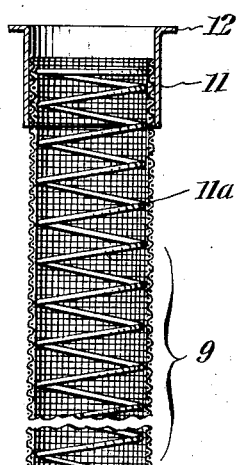
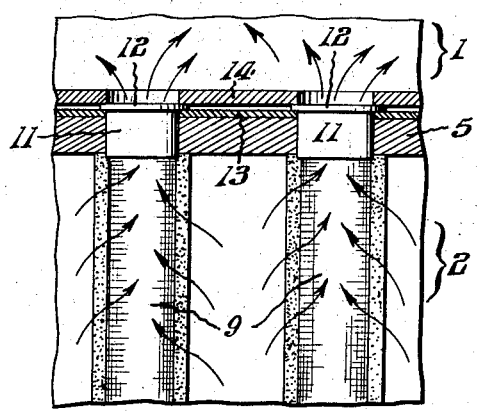

Dec. 2, 1958 C. E. KIRCHER, JR., ET AL 2,862,622
FILTERS
Filed Aug. 10, 1955 4 Sheets-Sheet 4

INVENTORS.
Charles E. Kircher Jr. &
BY Robert J. Jones,
Paul & Paul
ATTORNEYS.

United States Patent Office 2,862,622
Patented Dec. 2, 1958

2,862,622

FILTERS

Charles E. Kircher, Jr., Detroit, and Robert J. Jones, Dearborn, Mich., assignors to Detrex Chemical Industries, Inc., a corporation of Michigan Application August 10, 1955, Serial No. 527,513

3 Claims. (Cl. 210—333)

This invention relates to filters. More specifically, it is concerned with filters particularly useful in connection with dry-cleaning machines wherein the cleaning is accomplished with the aid of chlorinated solvents such as perchlorethylene or the like to which a definite quantity of filter aid in the form of a powder has been added.

The chief aim of our invention is to provide a simple, reliable and efficient filter by which the filter aid and entrained solid matter is filtered from the solvent as the latter is circulated between a supply reservoir and the dry cleaning machine during the treating cycle of the machine.

In connection with a filter having the above attributes, it is a further aim of our invention to provide facilities by which, from time to time during use of the filter, the solids accumulation can be sloughed from the screening surfaces and additional facilities whereby the sludge can be quickly and effectively dislodged from said surfaces after protracted periods of operation.

Other objects and attendant advantages will appear from the following detailed description of the attached drawings, wherein:

Fig. 1 is a view partly in elevation and partly in vertical section of a filter conveniently embodying our invention.

Figs. 2 and 3 are horizontal sections of the filter taken as indicated respectively by the angled arrows II—II and III—III in Fig. 1.

Fig. 4 is a fragmentary detail view in section drawn to a larger scale to better show the construction within the confines of the broken line rectangle IV in Fig. 1.

Fig. 5 is a fragmentary exploded view of the different constituent parts of the filter in juxtaposed relation.

Fig. 6 shows in axial section, a screen tube of which several are incorporated in the filter as more fully explained hereafter.

Figs. 7, 8, 9, 10 and 11 are diagrammatic views showing how the filter is used in practice.

Figure 11:
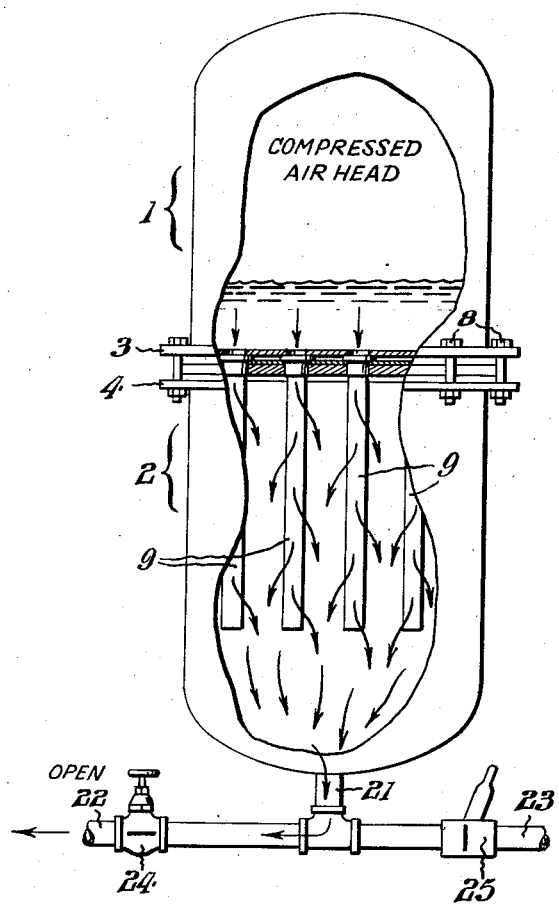

As illustrated in Figs. 1–5, our improved filter has an upright body composed of two vertically-aligned hollow cylindrical sections 1 and 2 which, respectively, are closed at their top and bottom ends and which, at their contiguous open ends, are provided respectively with outwardly projecting mating flanges 3 and 4. Extending crosswise of the filter is a circular diaphragm plate 5 of which the periphery is marginally engaged, with interposition of sealing gaskets 6 and 7, between the flanges 3 and 4 of the body sections 1 and 2, and which is held in place by headed clamp bolts 8 whereof the shanks pass through said flanges. As shown, the diaphragm plate 5 has multiple apertures for reception of as many tubes 9 fashioned from fine plain wire mesh 6, said tubes being closed at the bottom by cup section plugs 10 and internally reinforced by a spiral 11a of stout wire, and surrounded at their upper ends by collars 11 whereof the flanges 12 are restrained by an apertured discoid stop gasket 13. The tubes 9 are held in place by a hold-down plate 14 of which the apertures are smaller in diameter than the flanges 12 of the collars 11 on said tubes. The hold-down plate 14 is secured by cap screws 15 of which the shanks pass through the gasket 13 and threadedly engage into the diaphragm plate 5. Fig. 5 shows how, upon disassembling the parts of the filter, the tubes 9 can be readily removed, in the event of damage or deterioration, and replaced by new ones.

The liquid to be filtered is elevated from a storage reservoir R, see Fig. 7, by way of an induction conduit or pipe 16, which extends up to a level slightly below the level of the diaphragm 5, and thence downwardly as at 16a, the downward branch having a lateral portion which extends through an inlet somewhat above the bottom of the filter and which terminates in two downwardly-directed discharge branches 17. The pipe 16 is provided with a hand valve 18, and connecting into said pipe at the top level thereof from the filter body at that level is a small bleeder tube 16b, the purpose of which will be explained presently. The filtered effluent is conducted from the filter normally through a delivery conduit or pipe 19 which connects laterally into the upper body section 1, somewhat above the diaphragm 5, said pipe having a hand valve 20 interposed therein.

Leading from the bottom of the filter at the center is an outlet 21 whereto are connected two line branches 22 and 23, the former being a drain branch and the latter a waste branch. As shown, the drain branch 22 is provided with a hand valve 24, and the waste branch 23 with a quick opening manual valve 25. Connected into the top of the filter is a pipe 26 through which compressed air can be admitted under control of a hand valve 27, the pressure of air so admitted being indicated by a gauge designated 28.

Operation

During normal use of the filter, the valves 24, 25 and 27 are kept closed and, as diagrammatically shown in Fig. 7, the solvent is drawn by a pump P from the storage reservoir R, introduced into the filter by way of the induction pipe 16 and its pendent extension from which latter it is discharged downwardly from the branches 17 of said extension. In rising within the filter, filter aid, lint and other small solid particles are restrained and cling to the outer sides of the tubes 9 as shown in Fig. 7, while the filtered solvent passes upwardly through said tubes to the upper chamber of the filter above the diaphragm 5 and finally out through the delivery pipe 19 and the opened valve 20 to the dry cleaning machine conventionally represented and designated M, from which the overflow drains back into the storage tank, R.

During the drain or extraction periods in the cycle of the machine M, the pump P is stopped. As a consequence, some of the contents of the filter will flow back into the reservoir R by way of the piping 16a and 16 and the pump P. By seepage of filtered solvent from the upper part of the filter through the tubes 9, clinging filter cake will be sloughed from said tubes and gravitate to the bottom of the filter as diagrammatically shown in Fig. 9 of the drawings. This action continues until the liquid reaches the level of the pipe 16 when further siphoning through the pipe 16 will be interrupted by air relief when the liquid level drops to the opening of the small bleed tube 16b, complete draining of the filter being thereby prevented during the idle periods of the pump.

At the end of a day's operation of the machine M, the valves 18, 20 are closed and the valve 27 is opened as shown in Fig. 10, to admit compressed air into the top of the filter until the pressure reaches, say 70 p. s. i., after which said valve is closed again. The valve 25 is next momentarily opened and closed with creation of a sudden bump effect by the action of the compressed air head in the upper part of the filter as a result of which the solids accumulation on the tubes 9 is forcibly dislodged. Finally, the valve 24 is opened as in Fig. 11 and the filter contents allowed to drain through the pipe 22 to a suitable point of disposal or to a receiver such as disclosed in our co-pending patent application Serial No. 527,547 concurrently filed herewith, for recovery of the entrained solvent from the sludge, the draining being accelerated and rendered complete by the action of the compressed air.

While the preferred embodiment of this invention has been described in some detail, it will be obvious to one skilled in the art that various modifications may be made without departing from the invention as hereinafter claimed.

Having thus described our invention, we claim:

1. A filter, useful in separating suspended material such as filter aid from dry cleaning fluid or the like, comprising a hollow body; a diaphragm setting apart within the body an upper chamber and a lower chamber; screen filter tubes set into individual apertures in the diaphragm and depending therefrom into the lower chamber; an inlet adjacent the bottom of the lower chamber; an induction conduit through which the liquid to be filtered is pumped from a reservoir, said conduit extending upwardly, to a level slightly below that of the diaphragm and thence downwardly where it is connected to the inlet at the bottom of the lower chamber; an outlet adjacent the top of the upper chamber connected by a delivery conduit to the reservoir for return to the latter of the filtered liquid; and a relief tube extending from the top level of the induction conduit and connecting laterally into the lower chamber at a level slightly below that of the diaphragm whereby, upon cessation of the pumping, the liquid is permitted to gravitate from the upper chamber through the diaphragm by way of the filter tubes into the lower chamber only to the level of the relief tube, with incidental prevention of subsequent syphoning through the induction tube and complete draining of the filter.

2. A filter according to claim 1 wherein flow control valves are interposed respectively in the induction and delivery conduits.

3. A filter according to claim 1, further including a pipe with a normally closed interposed valve through which compressed air can be admitted into the top of the upper chamber when the filter is to be drained after protracted periods of operation; a drain pipe leading from the bottom of the lower chamber and having two divergent branches; a normally closed valve interposed in one of said branches; and a valve in the other of said branches adapted to be momentarily opened and closed for creation of a sudden bump effect by action of the compressed air head in the top of the upper chamber of the filter to dislodge accumulated solids from the outer surfaces of the filter tubes, before the first mentioned valve is opened for complete drainage of the filter.

References Cited in the file of this patent
UNITED STATES PATENTS

| | | |
|---|---|---|
| 1,171,892 | Salisbury | Feb. 15, 1916 |
| 2,354,623 | Tietig | July 25, 1944 |
| 2,562,730 | Miller | July 31, 1951 |
| 2,570,132 | Koupal | Oct. 2, 1951 |
| 2,595,913 | Baily | May 6, 1952 |
| 2,600,458 | Ackley et al. | June 17, 1952 |
| 2,625,273 | Schuller | Jan. 13, 1953 |
| 2,681,153 | Armbrust | June 15, 1954 |
| 2,693,882 | Olson et al. | Nov. 9, 1954 |
| 2,710,099 | Kalinske | June 7, 1955 |
| 2,742,158 | Schuller | Apr. 17, 1956 |

UNITED STATES PATENT OFFICE
CERTIFICATE OF CORRECTION

Patent No. 2,862,622                           December 2, 1958

Charles E. Kircher, Jr., et al.

It is hereby certified that error appears in the printed specification of the above numbered patent requiring correction and that the said Letters Patent should read as corrected below.

Column 1, line 66, strike out the numeral "6"; column 2, line 59, for "pipe 16" read -- pipe 16b --.

Signed and sealed this 30th day of June 1959.

(SEAL)
Attest:

KARL H. AXLINE
Attesting Officer

ROBERT C. WATSON
Commissioner of Patents